United States Patent
Liu et al.

(10) Patent No.: US 11,848,941 B2
(45) Date of Patent: Dec. 19, 2023

(54) COLLECTION OF DIAGNOSTIC INFORMATION IN A DEVICE

(71) Applicant: NXP B.V., Eindhoven (NL)

(72) Inventors: Kunyan Liu, San Diego, CA (US); Viral Madhukar Shah, San Diego, CA (US)

(73) Assignee: NXP B.V., Eindhoven (NL)

( * ) Notice: Subject to any disclaimer, the term of this patent is extended or adjusted under 35 U.S.C. 154(b) by 677 days.

(21) Appl. No.: 17/010,376

(22) Filed: Sep. 2, 2020

(65) Prior Publication Data

US 2022/0070181 A1 Mar. 3, 2022

(51) Int. Cl.
*H04L 29/06* (2006.01)
*G06F 11/32* (2006.01)
*G06F 11/30* (2006.01)
*G06Q 20/38* (2012.01)
*H04L 9/40* (2022.01)

(52) U.S. Cl.
CPC ...... *H04L 63/1416* (2013.01); *G06F 11/3058* (2013.01); *G06F 11/3075* (2013.01); *G06F 11/3089* (2013.01); *G06F 11/327* (2013.01); *G06Q 20/382* (2013.01); *H04L 63/1425* (2013.01); *H04L 2463/102* (2013.01)

(58) Field of Classification Search
CPC ............ H04L 63/1416; H04L 63/1425; H04L 2463/102; G06F 11/3058; G06F 11/3075; G06F 11/3089; G06F 11/327; G06Q 20/382
See application file for complete search history.

(56) References Cited

U.S. PATENT DOCUMENTS

| | | | |
|---|---|---|---|
| 8,689,012 B1* | 4/2014 | Bierbaum | H04W 12/047 |
| | | | 705/64 |
| 9,600,667 B2* | 3/2017 | Barau | G06F 21/71 |
| 2012/0078577 A1 | 3/2012 | Allen | |
| 2013/0013261 A1 | 1/2013 | Niessen et al. | |
| 2016/0035148 A1* | 2/2016 | Huang | H04L 9/0866 |
| | | | 701/31.4 |

(Continued)

FOREIGN PATENT DOCUMENTS

CN 109922056 A 6/2019

*Primary Examiner* — Kambiz Zand
*Assistant Examiner* — Afaq Ali
(74) *Attorney, Agent, or Firm* — Daniel D. Hill

(57) ABSTRACT

A method is provided for collecting diagnostic information in a device having a rich execution environment (REE) and a secure element (SE). The method includes detecting initialization of the device. If it is determined that the initialization of the device was a result of a potential security related event, a communication component of the REE responsible for communicating with the secure element is activated if not already activated. The secure element sends a request to the communication component for diagnostic information related to the security event. The diagnostic information is received in the SE from the communication component and stored in an attack log for storing security events. An attack log is generated in the secure element including the potential security event and the related diagnostic information. The attack log and the related diagnostic information is communicated to a secure server via a secure channel.

20 Claims, 3 Drawing Sheets

(56) References Cited

U.S. PATENT DOCUMENTS

| | | | |
|---|---|---|---|
| 2017/0041290 A1* | 2/2017 | Ning | G06F 21/60 |
| 2017/0364389 A1* | 12/2017 | Naganathan | G06F 11/302 |
| 2018/0091529 A1* | 3/2018 | Luger | H04L 63/145 |
| 2018/0232272 A1* | 8/2018 | Seigel | G06F 11/0787 |
| 2019/0311155 A1* | 10/2019 | Courtiade | H04W 12/47 |
| 2020/0076837 A1* | 3/2020 | Ladnai | G06Q 50/26 |
| 2021/0141680 A1* | 5/2021 | Johnson | G06F 11/3058 |

* cited by examiner

COLLECTION OF DIAGNOSTIC INFORMATION IN A DEVICE

BACKGROUND

Field

This disclosure relates generally to electronic devices, and more particularly, collecting of diagnostic information in a device.

RELATED ART

Today's security products, for example the NFC (near-field communication)-based mobile payment devices, usually contain a number of functional parts and a hardened security controller. The security controller often includes a number of countermeasures to detect different type of security events, such as logic faults and fault injection attacks. Typically, the security controller responds to those events by resetting the system, and over time, disabling sensitive activities if the number or frequency of such events reach certain thresholds.

However, countermeasures that detect security events can sometimes negatively impact the reliability of the device with false alarms, for example an otherwise insignificant disturbance may be detected as a secure event and cause an unexpected system reset, which can then further accumulate into system-disabling actions which render the device unusable. The problem is further complicated by the fact that such false alarms are often the result of complex interactions that may be difficult to predict during development of the device. While much effort may have been put into design, characterization, and testing to reduce the likelihood of such false alarms, it is often unrealistic to assume the false alarms and resulting unexpected actions can be completely eliminated before the devices are deployed in the field. Consequently, the false alarms can contribute significantly to the overall device failure rate and the impact is manifested in customer returns and sometimes considerable financial loss.

Therefore, there is a need for a device and method to allow monitoring of the device after deployment in the field before serious impact on reliability of the device occurs.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
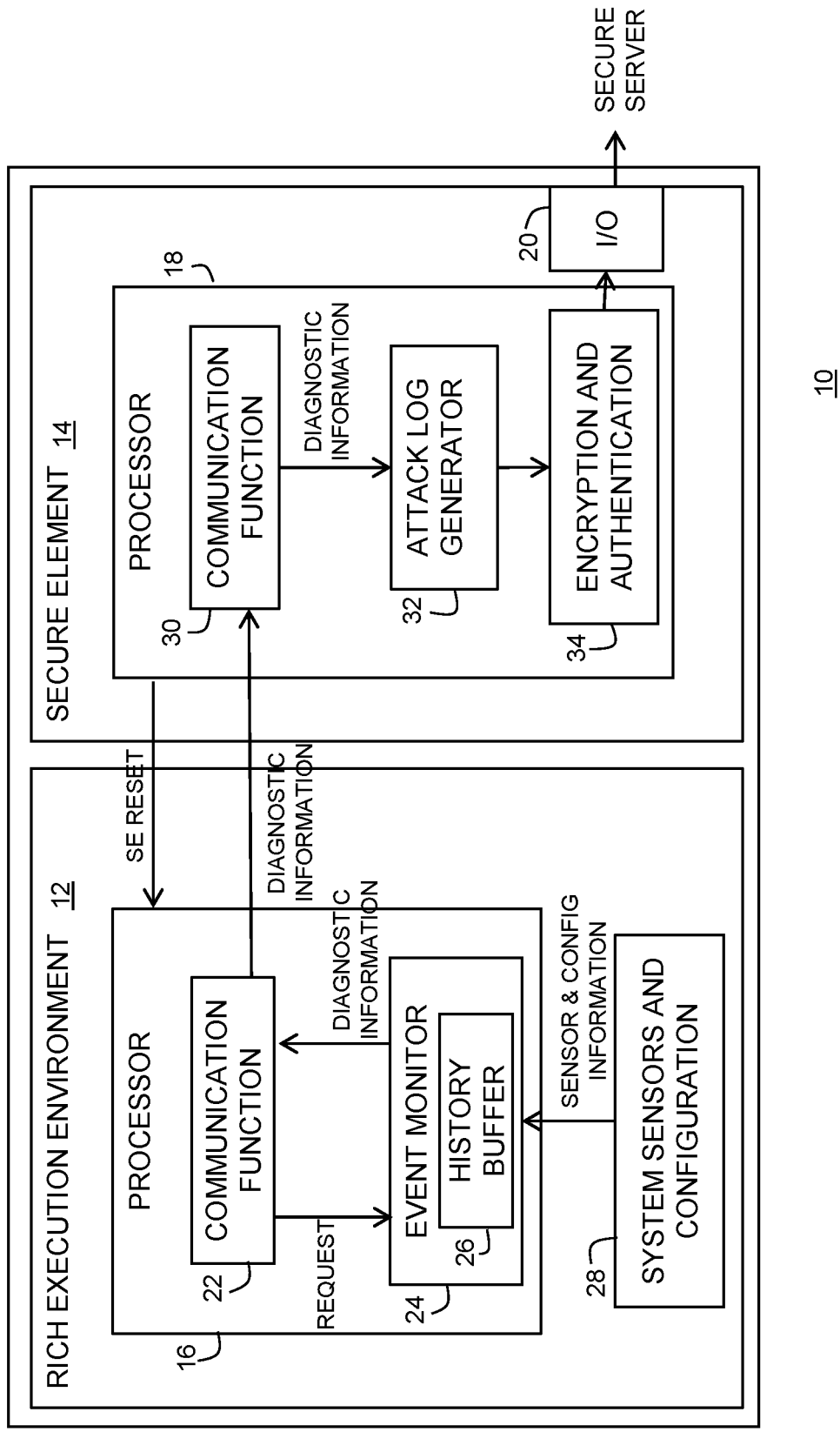
FIG. 1 illustrates a device in accordance with an embodiment.

Generally, there is provided, a method to enable product manufacturers to collect diagnostic information for monitoring the reliability of a deployed secured device. In one embodiment, a device having a rich execution environment (REE) and a secure element (SE) is provided. The method includes continuously collecting certain diagnostic information regarding operation of the REE. The diagnostic information may include sensor readings and system configuration information of the device, such as for example, supply voltage, supply voltage source, temperature, and various system activities. When a potentially security related event is detected by the SE, the SE requests the diagnostic information from the REE that may be related to the potential security related event. The potential security related event and diagnostic information are stored in an attack log of the SE and communicated over a secure channel to a secure server. The potential security related event and diagnostic information can be analyzed to determine what triggered the potential security related event. Information learned from the analysis may provide insight into the cause of the potential security event if, for example, the potential security event was a false alarm. The insight may be used to make modifications, adjustments, and improvements to the device. For example, sensor settings may be adjusted, or software behavior may be changed to avoid triggering the false alarms. Also, the insight gained from monitoring a deployed device may be used to avoid the issues when designing future products. The described detection and reporting mechanism do not compromise the security of the system and only introduces minimal additional hardware and software cost to the device.

In accordance with an embodiment, there is provided, in a device having a rich execution environment (REE) and a secure element, a method including: detecting initialization of the device; determining that the initialization of the device was a result of a potential security related event; activating a communication component in the REE responsible for communicating with the secure element; sending a request, by the secure element, to the communication component for diagnostic information related to the potential security event; receiving, by the secure element, the related diagnostic information from the communication component; generating an attack log in the secure element; and communicating the attack log with the related diagnostic information to a secure server via a secure channel. The related diagnostic information may include events in the REE, wherein the events in the REE may include one or more sensor readings and system configuration information. The related diagnostic information may further include one or more of operating voltage, temperature, a power management event, and a transceiver event of the device. The request for related diagnostic information may be for events that occurred during a predetermined time period relative to the potential security related event. Activating the communication component in the REE may further include activating a near-field communication (NFC) component in the REE. Communicating the attack log with the related diagnostic information may further include communicating the attack log with the related diagnostic information via the secure element. The method may further include continuously capturing and storing, during an active mode of the REE, the related diagnostic information in a memory. The method may further include encrypting the attack log with the related diagnostic information prior to communicating the attack log with the diagnostic information to the secure server. The method may be implemented in a near-field communication (NFC) device configured to provide security suitable for protecting payment transactions.

In another embodiment, there is provided, a method for collecting diagnostic information in a device having a rich execution environment (REE) and a secure element, the method including: continuously capturing and storing, during an active mode of the REE, the diagnostic information in a circular buffer having a configurable number of entries; detecting a reinitialization of the device; determining that the reinitialization of the device was a result of a potential security related event in the secure element; activating a near-field communication (NFC) component in the REE responsible for communication with the secure element; sending a request, by the secure element, to the NFC component for the diagnostic information collected in the REE, the diagnostic information comprising one or more sensor readings and system configuration information for a predetermined time period relative to the potential security related event in the secure element; receiving, by the secure element, the diagnostic information from the NFC component; generating an attack log in the secure element; and communicating the attack log with the diagnostic information to a secure server via a secure channel. The diagnostic information may further include one or more of operating voltage, temperature, a power management event, and a transceiver event of the device. Communicating the attack log with the diagnostic information may further include communicating the attack log with the diagnostic information via the secure element. The method may further include encrypting the attack log with the diagnostic information prior to communicating the attack log with the diagnostic information to the secure server. The method may be implemented in a device configured to provide security suitable for protecting payment transactions.

In yet another embodiment, there is provided, a hardware device including: a rich execution environment (REE) including: a processor configured to provide a communication function for the REE; and an event monitor comprising a history buffer configured to collect and store diagnostic information related to operation of the REE; and a secure element configured to collect diagnostic information from the REE via the communication function in response to detecting a potential security related event in the secure element, the secure element including: an attack log for storing the potential security related event and the diagnostic information; and an input/output circuit configured to connect the hardware device to a secure server via a secure channel and for communicating the attack log with the diagnostic information to the secure server. The hardware device may be a near-field communication (NFC) device. The event monitor may continuously capture and store, during an active mode of the REE, the diagnostic information in the history buffer, wherein the history buffer may include a configurable number of entries. The diagnostic information further may include one or more of operating voltage, temperature, a power management event, and a transceiver event of the device. The history buffer may include a circular buffer. The secure element may further include an encryption function for encrypting the attack log with the diagnostic information prior to communicating the attack log with the diagnostic information to the secure server.

FIG. 1 illustrates device 10 in accordance with an embodiment. Device 10 includes a rich execution environment (REE) 12 and secure element (SE) 14. Rich execution environment 12 includes processor 16 and system sensors and configuration circuit 28. Processor 16 includes communication function 22 and event monitor 24. Event monitor 24 includes history buffer 26. Secure element 14 includes processor 18 and input/output (I/O) block 20. Processor 18 includes communication function 30, attack log generator 32, and encryption and authentication 34. Processor 16 and processor 18 may be portions of the same processor. Device 10 may be implemented on one or more integrated circuits using a conventional semiconductor process technology. The functionality of device 10 may be implemented in hardware, software, or a combination of hardware and software. In one embodiment, device 10 may be a near-field communication (NFC) device having a payment processing application suitable for merchant and payment transactions. An embodiment will be described in the context of NFC, however, one skilled in the art will recognize that the described method and device may be applied to other technologies such as for example, Wi-Fi, ultra-wide band (UWB) and Bluetooth.

Rich execution environment (REE) 12 may be an area of a processor, or a separate processor, that runs under a separate operating system. The rich execution environment may be the main operating system for the device. Typically, untrusted applications run in REE 12, and REE 12 has little or no protection against attacks such as fault injection attacks or other side channel attacks against device 10. Also, REE 12 may provide more processing power than secure element 14. In an NFC application, REE 12 controls most of the system level functionalities such as power management, radio frequency (RF) transmission, and communication interfaces.

Secure element 14 may be an area of the same processor that includes REE 12, a different processor, or may not have any significant processor power available, depending on the application. Secure element 14 is separate from and isolated from REE 12 and provides a secure environment for processing sensitive applications and/or for storing sensitive information. Also, secure element 14 includes security against attacks or illegitimate attempts to access protected applications. In one embodiment, SE 14 may be based on an NFC secure element such as provided by NXP Semiconductors, Inc. In another embodiment, SE 14 may be implemented as a trusted execution environment (TEE) such as Trustzone by ARM. In yet another embodiment, SE 14 may be implemented differently.

In accordance with an embodiment, event monitor function 24 resides inside processor 16 and is responsible for monitoring the system activities and collecting diagnostic information (DIAGNOSTIC INFORMATION) from system sensors and configuration circuit 28 that may be relevant if a security event is triggered. In one embodiment, the diagnostic information is collected continuously in the background. The diagnostic information is collected, time stamped, and then stored in history buffer 26. In one embodiment, history buffer 26 is configurable and may be implemented as a circular buffer. The configurability of history buffer 26 may include a configurable number or entries, size of each entry, or another criterion. In another embodiment, history buffer 26 may be implemented in another type of volatile or non-volatile memory.

System sensors and configuration circuit 28 may include various sensors such as for example, voltage sensors, temperature sensors, and the like. The diagnostic information collected may include the current system configuration, supply status and recent system activities. More specifically, by way of example, the diagnostic information may include NFC resets, the turning on/off of an RF transmitter (not shown), switching between a transmit and a receive mode of the device, turning on/off a power amplifier (not shown), and switching power supply sources.

Upon receiving a security event, event monitor 24 checks all the events retrieved from history buffer 26. If a diagnostic event is deemed relevant, i.e., the diagnostic event happened within a configurable time window of the security event, the diagnostic event is included in history buffer 26, and then sent to SE 14 via communication function 22. Event monitor 24 is also responsible of maintaining a timing alignment between attack log 32 and the collected diagnostic information. For example, upon receipt of a request for diagnostic information from SE 14, event monitor 24 may include diagnostic information from a predetermined time period, such as for example, a 5 microsecond period just prior to the request for diagnostic information. In addition, during a security event, an attack counter (not shown) for counting security events may be incremented. If the attack counter value is over a predetermined threshold count value, then operation of SE 14 may be limited. For example, SE 14 may be placed in a restricted mode.

Communication function 22 in processor 16 is responsible for two-way communication between event monitor 24 and communication function 30 in processor 18. For example, the occurrence of a potential security event is communicated by SE 14 as a message (e.g., SECURITY_EVNET_FLAG) and the diagnostic information is retrieved from history buffer 26 for the relevant time period by event monitor 24 and passed to the communication function 30 as another message.

Attack log generator 32 in SE 14 is responsible for forming an attack logging message. Attack log generator 32 provides the message to encryption and authentication circuit 34 for encryption and a digital signature prior to communication. The encrypted message may be recorded in non-volatile memory and transferred out of device 10 to a remote server via I/O 20 and a secure channel. Also, the message may be encrypted using any currently used encryption algorithm, for example, an asymmetric cryptographic algorithm such as RSA (Rivest-Shamir-Adleman) and ECC (elliptic curve cryptography).

During reboot/reinitialization of device 10, it is determined if the reboot/system reinitialization is triggered by a potential security event. If the reboot was because of the potential security event, REE 12 is woken up if REE 12 was in sleep mode. A communication link between communication function 30 and communication function 22 is activated. The diagnostic information is retrieved from event monitor 24, passed across to secure element 14 and to attack log generator 32. The diagnostic information is then included with the security event in the attack log by attack log generator 32. The attack log with the diagnostic information is then transmitted, or allowed to be retrieved, by a secure server via I/O circuit 20 and a secure channel, wherein the secure channel may be over one or more of the internet, or a cellular system, or other communication system.

Figure 2:
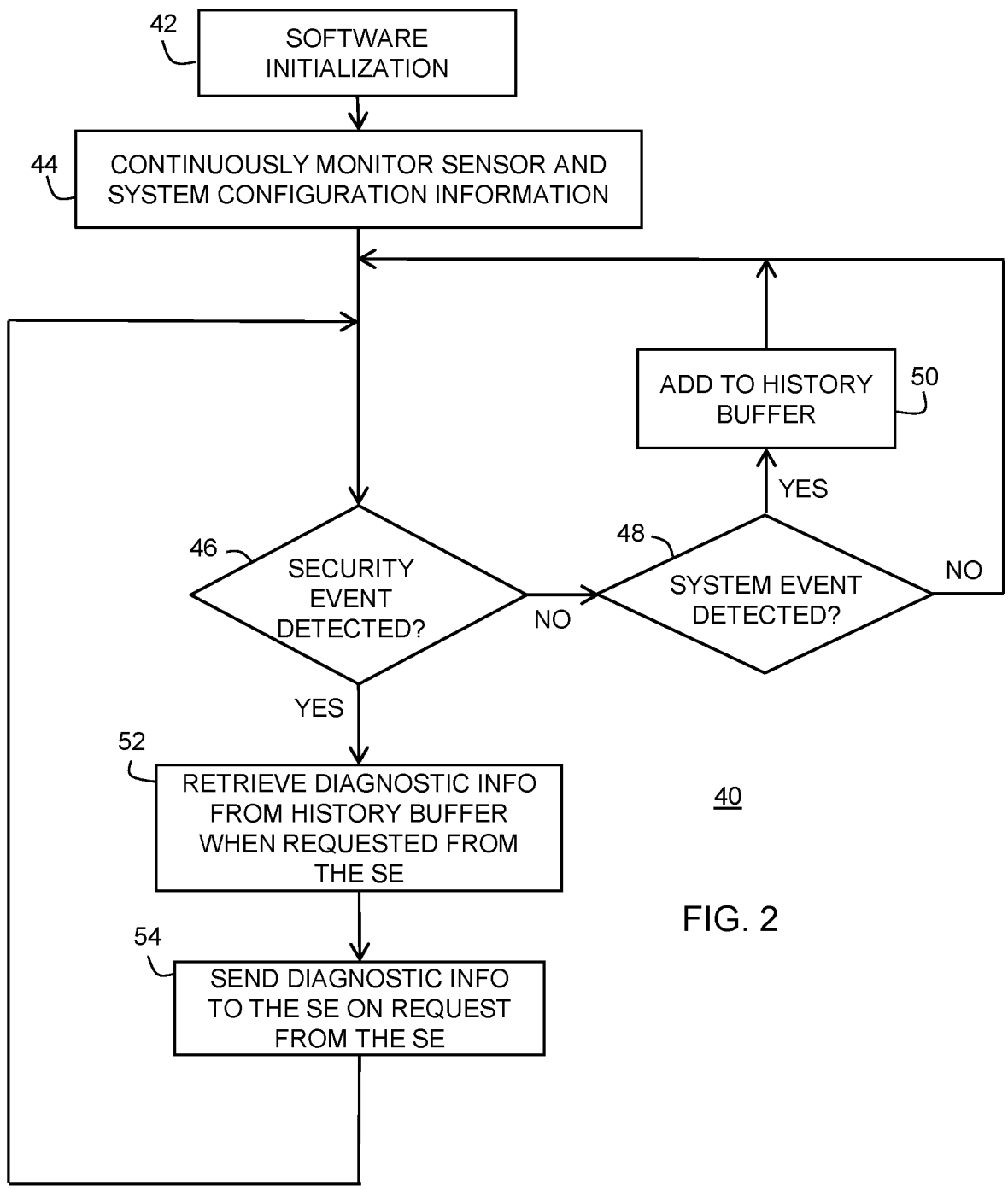
FIG. 2 illustrates a method for collecting diagnostic information in a device in accordance with an embodiment.

FIG. 2 illustrates method 40 for collecting diagnostic information in device 10 in accordance with an embodiment. Method 40 begins at step 42. At step 42, device 10 is initialized. At step 44, during operation of device 10, sensor and system configuration information are continuously monitored, retrieved, timestamped, and stored in history buffer 26. At decision step 46, it is determined if a security event has been detected. If yes, the YES path is taken to step 52. If at decision step 46, a security event was not detected, then the NO path is taken to decision step 48. At decision step 48, it is determined if a system event is detected in REE 12. If no, the NO path is taken back to the top of decision step 46. However, if a system event was detected, the YES path is taken to step 50 and diagnostic information about REE 12 is added to history buffer 26 and the method returns to the top of decision step 46. A system event may be any non-security event, such as a voltage fluctuation, over temperature condition, turning on or off certain functions, a change in power supply source, or the like, of a circuit or function controlled by REE 12. At step 52, following the detection of the security event at step 46, the relevant diagnostic information is retrieved from history buffer 26 in response to a request from SE 14. In one embodiment, the diagnostic information is relevant if it was timestamped within a predetermined time period of the security event. At step 54, the diagnostic information is sent to SE 14 when requested by the SE. After, step 54, method 40 returns step 46 and method 40 repeats while device 10 is operating.

Figure 3:
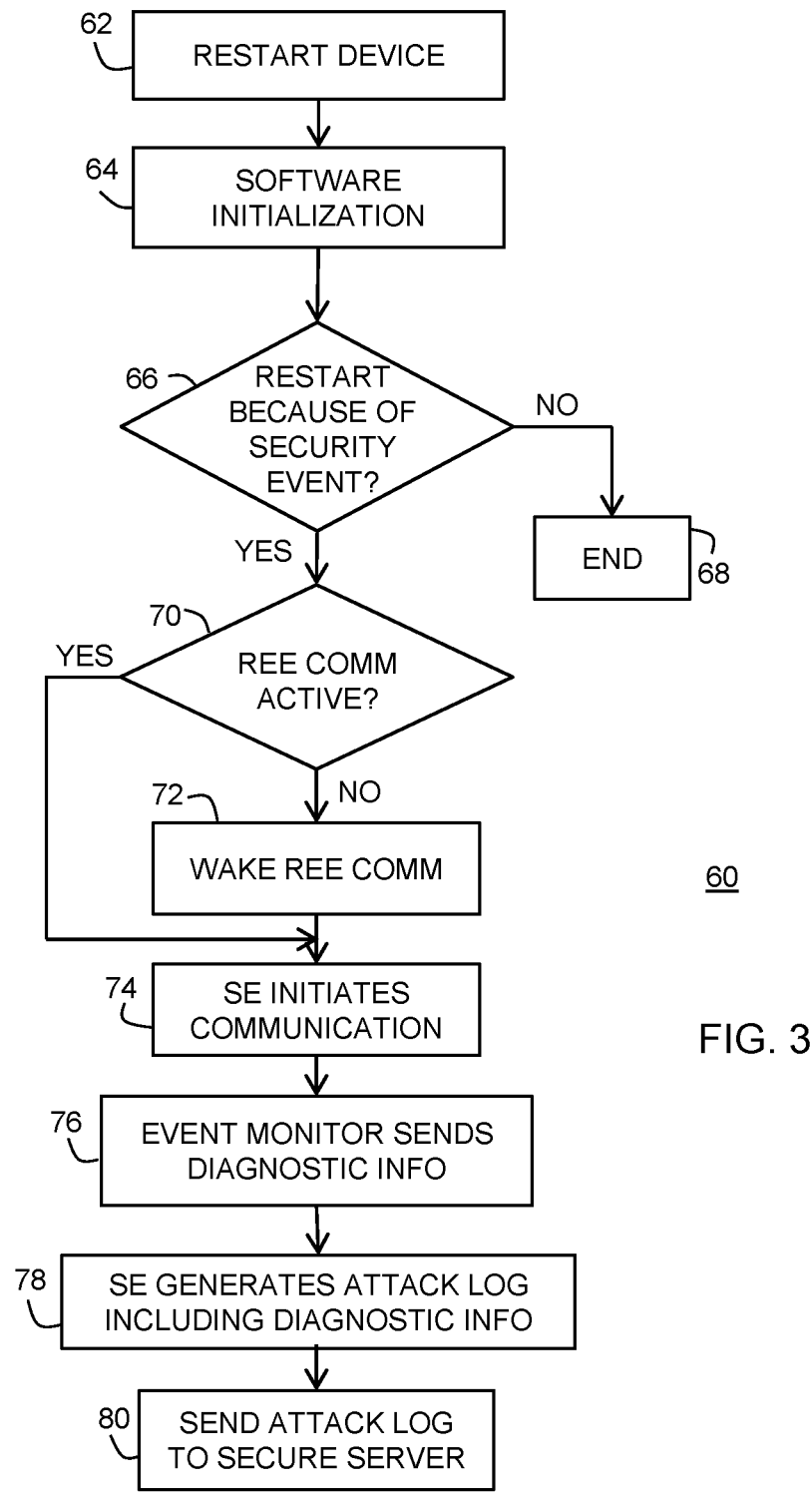
FIG. 3 illustrates a method for transferring diagnostic information on occurrence of a security event in accordance with an embodiment.

FIG. 3 illustrates method 60 for transferring diagnostic information on occurrence of a security event in accordance with an embodiment. Method 60 begins at step 62. In general, a security event in a secure element may result in the device resetting, or restarting, in an attempt to clear the security event. Accordingly, at step 62, device 10 is restarted and at step 64, the software in the device is initialized, or rebooted. At decision step 66, it is determined If the restart was because of a potential security event. If no, then the NO path is taken to step 68, and method 60 ends until another restart of device 10. If, however, the restart is because of a security event, the YES path is taken from step 66 to decision step 70. At decision step 70, it is determined if REE 12 communication function 22 is active. If yes, then the YES path is taken to step 74. However, if communication function 22 is not active, then the NO path is taken from step 70 to step 72, and communication function 22 is activated. At step 74, communication function 30 of SE 14 initiates communication with communication function 22 of REE 12 by sending a request for diagnostic information. At step 76, event monitor 24 sends diagnostic information to SE 14 that was timestamped within the predetermined time period of the security event. At step 78, attack log generator 32 of SE 14 generates an attack log that includes the security event and the retrieved diagnostic information. At step 80, the attack log and diagnostic information is sent to a secure server, where the attack log and diagnostic information generated in REE 12 may be used to determine what triggered the security event, such as for example, in the case where the security event is a false alarm. The results of the analysis may help to fix the problem and reduce the likelihood of the problem occurring in future devices.

Note that the functionality required to collect and communicate the diagnostic information with the attack log does not negatively impact the ability of device 10 to detect attacks, because the method is only performed in SE 14 after a security event is detected.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a device having a rich execution environment (REE) and a secure element, the secure element being more secure than the REE, a method comprising:
    detecting initialization of the device;
    determining that the initialization of the device was a result of a security related event detected in the secure element;
    activating a communication component in the REE responsible for communicating with the secure element;
    sending a request, by the secure element, to the communication component for diagnostic information related to the security event;
    receiving, by the secure element, the related diagnostic information from the communication component;
    generating an attack log in the secure element; and
    communicating the attack log with the related diagnostic information to a secure server via a secure channel;
    analyzing the attack log with the diagnostic information to determine that the security related event was a false alarm; and
    making corrections to reduce a likelihood of a reoccurrence of the false alarm.

2. The method of claim 1, wherein the related diagnostic information comprises events in the REE, wherein the events in the REE comprise one or more sensor readings and system configuration information.

3. The method of claim 2, wherein the related diagnostic information further comprises one or more of operating voltage, temperature, a power management event, and a transceiver event of the device.

4. The method of claim 2, wherein the request for related diagnostic information is for events that occurred during a predetermined time period relative to the security related event.

5. The method of claim 1, wherein activating the communication component in the REE further comprises activating a near-field communication (NFC) component in the REE.

6. The method of claim 5, wherein communicating the attack log with the related diagnostic information further comprises communicating the attack log with the related diagnostic information via the secure element.

7. The method of claim 1, further comprising continuously capturing and storing, during an active mode of the REE, the related diagnostic information in a memory.

8. The method of claim 1, further comprising encrypting the attack log with the related diagnostic information prior to communicating the attack log with the diagnostic information to the secure server.

9. The method of claim 1, wherein the method is implemented in a near-field communication (NFC) device configured to provide security suitable for protecting payment transactions.

10. A method for collecting diagnostic information in a device having a rich execution environment (REE) and a secure element, the secure element being more secure than the REE, the method comprising:
    continuously capturing and storing, during an active mode of the REE, the diagnostic information in a circular buffer having a configurable number of entries;
    detecting a reinitialization of the device;
    determining that the reinitialization of the device was a result of a security related event in the secure element;
    activating a near-field communication (NFC) component in the REE responsible for communication with the secure element;
    sending a request, by the secure element, to the NFC component for the diagnostic information collected in the REE, the diagnostic information comprising one or more sensor readings and system configuration information for a predetermined time period relative to the security related event in the secure element;
    receiving, by the secure element, the diagnostic information from the NFC component;
    generating an attack log in the secure element;
    communicating the attack log with the diagnostic information to a secure server via a secure channel;
    analyzing the attack log with the diagnostic information to determine that the security related event was a false alarm; and
    making corrections to reduce a likelihood of a reoccurrence of the false alarm.

11. The method of claim 10, wherein the diagnostic information further comprises one or more of operating voltage, temperature, a power management event, and a transceiver event of the device.

12. The method of claim 10, wherein communicating the attack log with the diagnostic information further comprises communicating the attack log with the diagnostic information via the secure element.

13. The method of claim 10, further comprising encrypting the attack log with the diagnostic information prior to communicating the attack log with the diagnostic information to the secure server.

14. The method of claim 10, wherein the method is implemented in a device configured to provide security suitable for protecting payment transactions.

15. A hardware device comprising:
    a rich execution environment (REE) comprising:
        a processor configured to provide a communication function for the REE; and
        an event monitor comprising a history buffer configured to collect and store diagnostic information related to operation of the REE; and
    a secure element configured to collect diagnostic information from the REE via the communication function in response to detecting a security related event in the secure element, wherein the secure element is more secure than the REE, the secure element comprising:
        an attack log for storing the security related event and the diagnostic information; and an input/output circuit configured to connect the hardware device to a secure server via a secure channel and for communicating the attack log with the diagnostic information to the secure server, wherein the attack log with the diagnostic information is analyzed to determine that the security related event was a false alarm, and making corrections to reduce a likelihood of a reoccurrence of the false alarm.

16. The hardware device of claim 15, wherein the hardware device is a near-field communication (NFC) device.

17. The hardware device of claim 15, wherein the event monitor continuously captures and stores, during an active mode of the REE, the diagnostic information in the history buffer, wherein the history buffer comprises a configurable number of entries.

18. The hardware device of claim 15, wherein the diagnostic information further comprises one or more of operating voltage, temperature, a power management event, and a transceiver event of the device.

19. The hardware device of claim 15, wherein the history buffer comprises a circular buffer.

20. The hardware device of claim 15, wherein the secure element further comprises an encryption function for encrypting the attack log with the diagnostic information prior to communicating the attack log with the diagnostic information to the secure server.

* * * * *